United States Patent
O'Neill et al.

(10) Patent No.: US 10,734,676 B2
(45) Date of Patent: Aug. 4, 2020

(54) SOLID ELECTROLYTE COMPOSITIONS

(71) Applicant: Wildcat Discovery Technologies, Inc., San Diego, CA (US)

(72) Inventors: Cory O'Neill, San Diego, CA (US); Bin Li, San Diego, CA (US); Alex Freigang, San Diego, CA (US); Deidre Strand, San Diego, CA (US)

(73) Assignee: WILDCAT DISCOVERY TECHNOLOGIES, INC, San Diego, CA (US)

( * ) Notice: Subject to any disclaimer, the term of this patent is extended or adjusted under 35 U.S.C. 154(b) by 0 days.

(21) Appl. No.: 15/639,899

(22) Filed: Jun. 30, 2017

(65) Prior Publication Data

US 2018/0006328 A1 Jan. 4, 2018

Related U.S. Application Data

(60) Provisional application No. 62/356,852, filed on Jun. 30, 2016.

(51) Int. Cl.
*H01M 10/0565* (2010.01)
*H01M 10/0525* (2010.01)
(Continued)

(52) U.S. Cl.
CPC ......... *H01M 10/0565* (2013.01); *C08F 14/22* (2013.01); *C08G 65/08* (2013.01); *C08L 71/02* (2013.01); *H01M 10/052* (2013.01); *H01M 10/056* (2013.01); *H01M 10/0525* (2013.01); *H01M 10/0562* (2013.01); *C01D 15/00* (2013.01); *C01F 17/206* (2020.01); *C01G 23/005* (2013.01); *C01G 35/006* (2013.01); *H01M 2300/0065* (2013.01);
(Continued)

(58) Field of Classification Search
CPC ......... H01M 10/0565; H01M 10/0562; H01M 10/0525; C08G 65/08; C08G 35/006; C08G 23/005
See application file for complete search history.

(56) References Cited

U.S. PATENT DOCUMENTS 4,009,092 A 2/1977 Taylor
4,722,877 A 2/1988 Sammells
(Continued)

FOREIGN PATENT DOCUMENTS

| CN | 103985900 A | * | 8/2014 | ........ H01M 10/0525 |
| CN | 104600358 A | | 5/2015 | |

(Continued)

OTHER PUBLICATIONS

Abouimrane, A., et al., "Solid Electrolyte Based on Succinonitrile and LiBOB Interface Stability and Application in Lithium Batteries", Journal of the Electrochemical Society, 154 (11) A1031-A1034 (2007).
(Continued)

*Primary Examiner* — Osei K Amponsah
(74) *Attorney, Agent, or Firm* — The Small Patent Law Group LLC; Philip S. Hof

(57) ABSTRACT

A solid-state electrolyte including a polymer, which can be ion-conducting or non-conducting; an ion-conducting inorganic material; a lithium salt; an additive salt and optionally a coupling agent.

20 Claims, 2 Drawing Sheets

(51) Int. Cl.
| | |
|---|---|
| *H01M 10/0562* | (2010.01) |
| *H01M 10/052* | (2010.01) |
| *H01M 10/056* | (2010.01) |
| *C08L 71/02* | (2006.01) |
| *C08F 14/22* | (2006.01) |
| *C08G 65/08* | (2006.01) |
| *C01F 17/206* | (2020.01) |
| *C01D 15/00* | (2006.01) |
| *C01G 23/00* | (2006.01) |
| *C01G 35/00* | (2006.01) |

(52) U.S. Cl.
CPC ............ *H01M 2300/0068* (2013.01); *H01M 2300/0082* (2013.01); *H01M 2300/0091* (2013.01)

(56) References Cited

U.S. PATENT DOCUMENTS

| | | | | |
|---|---|---|---|---|
| 5,300,374 | A * | 4/1994 | Agrawal | C08L 71/02 427/386 |
| 5,599,355 | A | 2/1997 | Nagasubramanian et al. | |
| 6,326,105 | B1 * | 12/2001 | Kejha | H01M 10/0525 252/62.2 |
| 6,822,065 | B1 * | 11/2004 | Sanchez | H01M 10/0565 429/199 |
| 2002/0197535 | A1 | 12/2002 | Dudley et al. | |
| 2003/0094599 | A1 * | 5/2003 | Le | C08G 18/2027 252/500 |
| 2004/0029014 | A1 | 2/2004 | Hwang et al. | |
| 2004/0106046 | A1 * | 6/2004 | Inda | H01M 10/0436 429/322 |
| 2005/0132562 | A1 | 6/2005 | Saito et al. | |
| 2006/0035148 | A1 | 2/2006 | Balaya et al. | |
| 2007/0020527 | A1 | 1/2007 | Ehrismann et al. | |
| 2008/0124630 | A1 | 5/2008 | Kim et al. | |
| 2008/0220334 | A1 * | 9/2008 | Inda | C03C 4/18 429/322 |
| 2008/0248396 | A1 | 10/2008 | Jung et al. | |
| 2008/0268346 | A1 | 10/2008 | Inda | |
| 2008/0292963 | A1 | 11/2008 | Sato et al. | |
| 2008/0318133 | A1 | 12/2008 | Matsuyama et al. | |
| 2009/0104538 | A1 * | 4/2009 | Wakihara | H01M 10/0525 429/317 |
| 2009/0136830 | A1 * | 5/2009 | Gordon | H01M 10/052 429/50 |
| 2009/0191462 | A1 | 7/2009 | Matsui et al. | |
| 2011/0177398 | A1 | 7/2011 | Affinito et al. | |
| 2011/0300432 | A1 | 12/2011 | Snyder et al. | |
| 2012/0094186 | A1 | 4/2012 | Chu et al. | |
| 2012/0288770 | A1 * | 11/2012 | Yokoyama | H01M 10/052 429/316 |
| 2013/0026409 | A1 | 1/2013 | Baker et al. | |
| 2013/0260207 | A1 * | 10/2013 | Uemura | H01M 2/16 429/144 |
| 2013/0273437 | A1 | 10/2013 | Yoshioka et al. | |
| 2013/0309570 | A1 | 11/2013 | Kim et al. | |
| 2014/0134483 | A1 | 5/2014 | Ouchi et al. | |
| 2014/0170504 | A1 | 6/2014 | Baek et al. | |
| 2014/0308570 | A1 | 10/2014 | Gaben et al. | |
| 2014/0308576 | A1 * | 10/2014 | Gaben | C25D 13/02 429/185 |
| 2014/0370398 | A1 | 12/2014 | Lee et al. | |
| 2015/0171463 | A1 | 6/2015 | Liang et al. | |
| 2015/0188187 | A1 * | 7/2015 | Strand | H01M 10/056 429/317 |
| 2017/0047581 | A1 | 2/2017 | Lu et al. | |
| 2017/0077547 | A1 | 3/2017 | Takami et al. | |
| 2017/0309914 | A1 | 10/2017 | Drews et al. | |

FOREIGN PATENT DOCUMENTS

| | | |
|---|---|---|
| EP | 1424746 A1 | 6/2004 |
| JP | 1999031415 A | 2/1999 |
| JP | 2006086102 A | 3/2006 |
| JP | 2011108499 A | 6/2011 |
| JP | 2015079702 A | 4/2015 |
| WO | 1997049106 A1 | 12/1997 |

OTHER PUBLICATIONS

Croce, F., et al., "Nanocomposite, PEO-LiBOB Polymer Electrolytes for Low Temperature, Lithium Rechargeable Batteries", Journal of New Materials for Electrochemical Systems 9, 3-9 (2006).

Egashira, Minato, et al., "Effects of the Surface Treatment of the Al2O3 Filler on the Lithium Electrode/Solid Polymer Electrolyte Interface Properties", Electrochimica Acta 52 (2006) 1082-1086.

Ghosh, Ayan, et al., "Block Copolymer Solid Battery Electrolyte with High Li-Ion Transference Number", Journal of the Electrochemical Society, 157 (7) A846-A849 (2010).

Sumathipala, H. H., et al., "High Performance PEO-based Polymer Electrolytes and their Application in Rechargeable Lithium Polymer Batteries", Ionics (2007) 13:281-286.

Teran, Alexander A., et al., "Effect of Molecular Weight on Conductivity of Polymer Electrolytes", Solid State Ionics 203 (2011) 18-21.

Wang, Congxiao, et al., "All Solid-State Li/LixMnO2 Polymer Battery Using Ceramic Modified Polymer Electrolytes", Journal of the Electrochemical Society, 149 (8) A967-A972 (2002).

Zhang, Ding, et al., "Electrochemical Stability of Lithium bis(oxatlato) borate Containing Solid Polymer Electrolyte for Lithium Ion Batteries", Journal of Power Sources 196 (2011) 10120-10125.

Inada, Ryoji, et al., "Synthesis and properties of Al-free Li7—xLa3Zr2—xTaxO12 garnet related oxides", Solid State Ionics, 262 (2014) 568-5723.

International Search Report & Written Opinion dated Dec. 7, 2017 in International application No. PCT/US2017/040391.

International Search Report & Written Opinion dated in Oct. 11, 2017 in International application No. PCT/US2017/040374.

International Search Report & Written Opinion dated Mar. 5, 2018 in International application No. PCT/US2017/062845.

Winand, Jean-Marc et al., "Nouvelles Solutions Solides LI (MIV) 2—x (NIV)x(PO 4)3 (L=Li, Na M, N=GE, Sn, Ti, Zr, Hf) Synthese et Etude par Diffraction x et Conductivite Ionique", Journal of Solid State Chemistry, 93, 1991, pp. 341-349.

Extended European Search Report for corresponding EP Application No. 17821393.0-1107/3479431 dated Nov. 13, 2019 (6 pages).

Office Action for corresponding JP Application No. 2018-568274 dated Feb. 4, 2020 (8 pages).

\* cited by examiner

SOLID ELECTROLYTE COMPOSITIONS

BACKGROUND OF THE INVENTION

The present invention is in the field of battery technology and, more particularly, in the area of solid materials and composite materials for use in electrolytes in electrochemical cells.

Conventional lithium ion batteries include a positive electrode (or cathode as used herein), a negative electrode (or anode as used herein), an electrolyte, and, frequently, a separator. The electrolyte typically includes a liquid component that facilitates lithium ion transport and, in particular, enables ion penetration into the electrode materials.

In contrast, so-called solid-state lithium ion batteries do not include liquid in their principal battery components. Solid-state batteries can have certain advantages over liquid electrolyte batteries, such as improvements in safety because liquid electrolytes often contain volatile organic solvents. Solid-state batteries offer a wider range of packaging configurations because a liquid-tight seal is not necessary as it is with liquid electrolytes.

Generally, batteries having a solid-state electrolyte can have various advantages over batteries that contain liquid electrolyte. For small cells, such as those used in medical devices, the primary advantage is overall volumetric energy density. For example, small electrochemical cells often use specific packaging to contain the liquid electrolyte. For a typical packaging thickness of 0.5 mm, only about 60 percent of the volume can be used for the battery with the remainder being the volume of the packaging. As the cell dimensions get smaller, the problem becomes worse.

Elimination of the liquid electrolyte facilitates alternative, smaller packaging solutions for the battery. Thus, a substantial increase in the interior/exterior volume can be achieved, resulting in a larger total amount of stored energy in the same amount of space. Therefore, an all solid-state battery is desirable for medical applications requiring small batteries. The value is even greater for implantable, primary battery applications as the total energy stored often defines the device lifetime in the body.

Further, solid-state batteries can use lithium metal as the anode, thereby dramatically increasing the energy density of the battery as compared to the carbon-based anodes typically used in liquid electrolyte lithium ion batteries. With repeated cycling, lithium metal can form dendrites, which can penetrate a conventional porous separator and result in electrical shorting and runaway thermal reactions. This risk is mitigated through the use of a solid nonporous electrolyte for preventing penetration of lithium dendrites and enabling the safe use of lithium metal anodes, which directly translates to large gains in energy density, irrespective of cathode chemistry.

The electrolyte material in a solid-state lithium ion battery can be a polymer. In particular, poly(ethylene oxide) ("PEO") can be used in forming solid polymer electrolytes. PEO has the ability to conduct lithium ions as positive lithium ions are solubilized and/or complexed by the ethylene oxide groups on the polymer chain. Solid electrolytes formed from PEO can have crystalline and amorphous regions, and it is believed that lithium ions move preferentially through the amorphous portion of the PEO material. In general, ionic conductivities on the order of $1 \times 10^{-6}$ S/cm to $1 \times 10^{-5}$ S/cm at room temperature can be obtained with variations on PEO-based electrolyte formulations. The electrolyte is typically formulated by adding a lithium ion salt to the PEO in advance of building the battery, which is a formulation process similar to liquid electrolytes.

However, solid-state batteries have not achieved widespread adoption because of practical limitations. For example, while polymeric solid-state electrolyte materials like PEO are capable of conducting lithium ions, their ionic conductivities are inadequate for practical power performance. Successful solid-state batteries require thin film structures, which reduce energy density. But, a battery with reduced energy density has limited utility.

Further, solid-state batteries tend to have a substantial amount or degrees of interfaces among the different solid components of the battery. The presence of such interfaces can limit lithium ion transport and impede battery performance. Interfaces can occur (i) between the domains of active material in the electrode and other components in the electrode, (ii) between the cathode and the solid electrolyte, and (iii) between the solid electrolyte and the anode structure. Poor lithium ion transport across these interfaces results in high impedance in batteries and a low capacity on charge or discharge.

A polymer solid-state electrolyte is commonly understood to have the following advantages: (i) relatively easily processed by standard solution casting or slurry casting techniques; (ii) mechanical flexibility allowing the polymer to conform to electrode surfaces, allowing for good mechanical compliance and comparatively low loss of surface contact during cycling; and (iii) relatively easy to drop in to existing lithium ion battery manufacturing with solid polymer films similar to today's separators.

However, a polymer solid-state electrolyte is also commonly understood to have the following disadvantages: (i) relatively low conductivity, on the order of $10^{-6}$-$10^{-5}$ S/cm at room temperature; (ii) current state of the art polymer solid-state electrolytes typically consist of PEO-type polymers, which have poor stability at high voltage (for example, greater than about 4.2 V); and (iii) common polymer solid-state electrolytes actually form relatively soft films that are not expected to prevent lithium dendrite penetration.

In some instances, inorganic materials have been used to attempt to improve the performance of polymer solid-state electrolytes. For example, U.S. Patent Publication 2013/0026409 discloses a composite solid electrolyte with a glass or glass-ceramic inclusion and an ionically conductive polymer. However, this solid electrolyte requires a redox active additive. As another example, U.S. Pat. No. 5,599,355 discloses a method of forming a composite solid electrolyte with a polymer, salt, and an inorganic particle (such as alumina). The particles are reinforcing filler for solid electrolyte and do not transport lithium. As yet another example, U.S. Pat. No. 5,599,355 discloses a composite solid state electrolyte containing a triflate salt, PEO, and a lightweight oxide filler material. Again, the oxide filler is not a lithium ion conductor or intercalation compound.

More generally, ionically conductive polymers like PEO have been disclosed with the use of a lithium salt as the source of lithium ions in the solid electrolyte. For example, Teran et al., *Solid State Ionics* (2011) 18-21; Sumathipala et al., *Ionics* (2007) 13: 281-286; Abouimrane et al., *JECS* 154(11) A1031-A1034 (2007); Wang et al., *JECS,* 149(8) A967-A972 (2002); and Egashira et al., *Electrochimica Acta* 52 (2006) 1082-1086 each disclose different solid electrolyte formulations with PEO and a lithium salt as the source for lithium ions. Still further the last two references (Wang et al. and Egashira et al.) each disclose non-ion conducting inorganic nanoparticles that are believed to improve the ionic conductivity of the PEO film by preventing/disrupting polymer crystallinity. However, none of these formulations both addresses all the limitations of solid electrolytes and provides the performance improvements seen in the embodiments disclosed below.

BRIEF SUMMARY OF THE INVENTION

Embodiments of the present invention include a lithium ion battery having an anode, a cathode comprising an electrode active material, and a solid-state electrolyte. The solid electrolyte includes a polymer, which can be ion-conducting or non-conducting; an ion-conducting inorganic material; a salt; and optionally a coupling agent. In certain preferred embodiments, the solid-state electrolyte comprises PVdF, lithium bis(trifluoromethanesulfonyl)imide, and $Li_{1.3}Ti_{1.7}Al_{0.3}(PO_4)_3$.

Embodiments of the invention include methods of making a solid-state electrolyte and a battery containing a solid-state electrolyte, as well as methods of conditioning and using such a battery.

DETAILED DESCRIPTION OF THE INVENTION

Figures 1A, 1B:
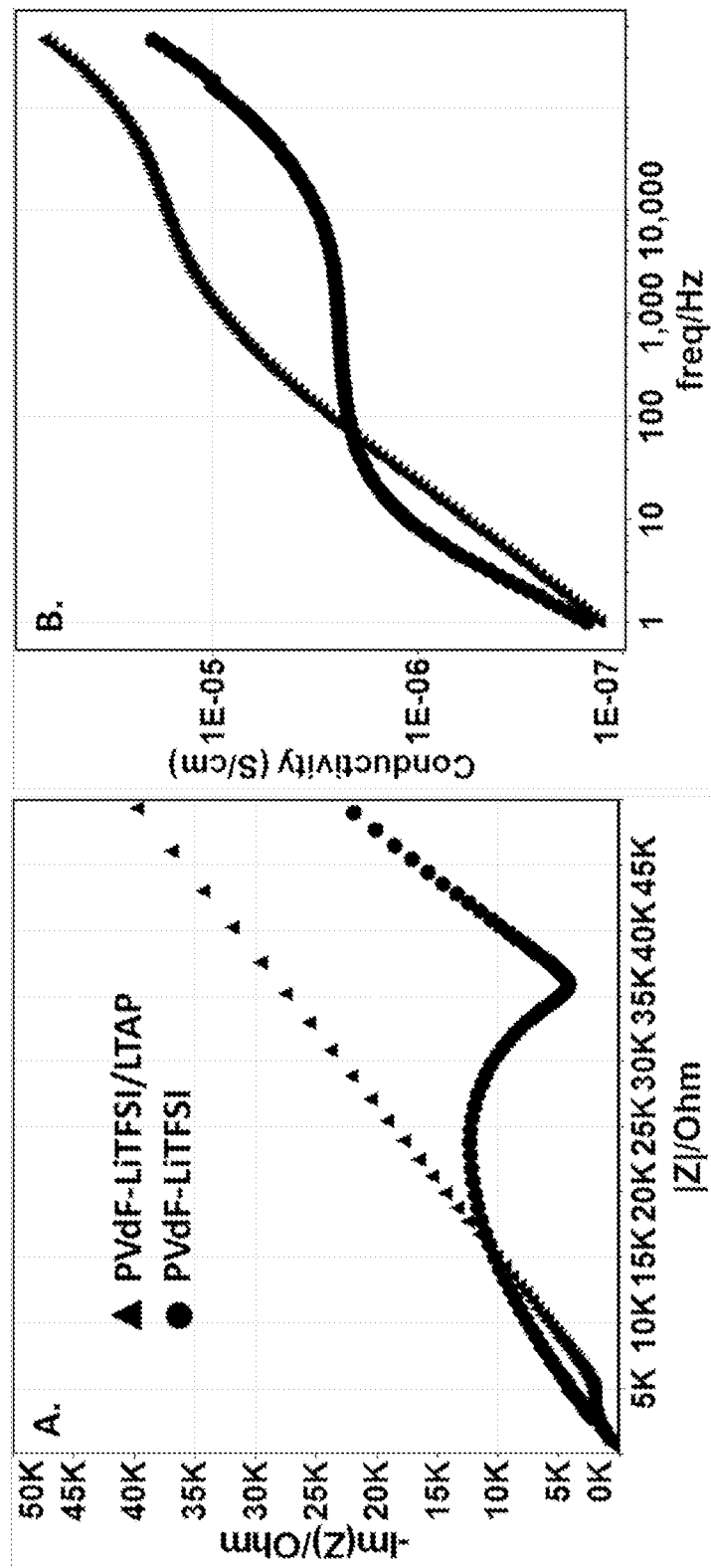
FIG. 1A illustrates the results of electrochemical testing of solid electrolyte formulations according to certain embodiments of the invention.
FIG. 1B illustrates the results of electrochemical testing of solid electrolyte formulations according to certain embodiments of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely, as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A "C-rate" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "solid-state electrolyte" as used herein is used primarily to distinguish from electrolyte formulations where the formulation is an entirely liquid phase, almost entirely liquid phase, or substantially liquid phase.

The term "polymer" as used herein refers generally to a molecule whose structure is composed of multiple repeating units. The structure can be linear or branched. The term includes co-polymers of all types (such as, but not limited to, block, random, and alternating co-polymers).

The term "wt %" as used herein refers to the weight of the component as a percent of the total weight of the electrolyte formulation.

Ranges presented herein are inclusive of their endpoints. Thus, for example, the range 1 to 3 includes the values 1 and 3, as well as intermediate values.

Solid-state electrolytes can be formed using polymeric materials with ion-conducting properties. The polymeric materials can be used in the solid electrolyte formulation that is used to conduct ions from one electrode to another. For optimum performance, the polymeric material should have suitable mechanical properties and thermal stability, in addition to the desired level of ionic conductivity, and specifically lithium ion conductivity.

As with other applications using polymeric materials, the properties of the solid structure of the polymeric material can be influenced by (i) the choice of polymer, (ii) the molecular weight of the polymer, (iii) the polydispersity of the polymer, (iv) the processing conditions, and (v) the presence of additives. While combinations of these factors are generally known, it is not necessarily predictable how these various factors will interact in a given application. Certain polymeric materials have shown utility for use in solid-state electrolyte formulations based on the combination of factors listed above.

Certain embodiments of the present invention include polymers with ion-conducting properties and polymers without substantial ion-conducting properties. In some cases, embodiments of the present invention include polymers that may be considered non-conductors of lithium ions. In all cases, the polymer is combined with an inorganic material to form a composite material, and this composite material is used to form the solid-state electrolyte. Advantageously, the lithium ion conduction can be driven predominantly by the inorganic component, while the polymer component allows the electrolyte to be processed by standard solution processing methods.

In some embodiments, the ion-conducting polymer is poly(ethylene oxide) ("PEO"). PEO is a commodity polymer available in a variety of molecular weights. PEO can range from very short oligomers of about 300 g/mol (or 300 Da) to very high molecular weights of 10,000,000 g/mol (or 10,000 kDa). At molecular weights of 20 kDa and below, PEO is typically referred to as poly(ethylene glycol) or PEG. PEO has been used as a separator in conventional liquid electrolyte systems and, as described above, as a component in a thin-film solid-state electrolyte. The use of PEO as a separator in conventional liquid electrolyte systems is technically distinct from the use described herein, and such use in separators is not predictive of the results achieved by certain of the embodiments disclosed herein.

PEO processed into multiple structures, whether intended for a solid-state electrolyte or not, can have both crystalline and amorphous domains. Ionic conductivity happens more readily in the amorphous domains and, therefore, processing conditions that decrease crystalline domain size and/or the overall amount of crystallinity are preferred for uses of PEO that include solid-state electrolyte formulations. Some research has used carbonate solvents, such as ethylene carbonate, dimethyl carbonate, or diethyl carbonate, as plasticizers to improve ionic transport and reduce interfacial impedance. However, this involves the addition of a volatile, flammable solvent to the battery and negates many of the safety benefits brought by a solid-state electrolyte. In PEO systems, PEG can be added to achieve the desired processing properties, such as a preferred solution viscosity, film modulus, or film glass transition temperature.

While PEO is discussed herein as a possible polymeric material for use in the solid-state electrolyte, it is understood that other polymers with equivalent chemical, electrochemical, mechanical, and/or thermal properties can be used in place of or in addition to PEO and/or PEO/PEG mixtures. Further, copolymers that include PEO, PEG, or PEO-like polymers in at least one segment of the copolymer can be suitable for certain embodiments described herein. Thus, the embodiments described herein that refer to PEO or PEO/PEG are understood to encompass other such polymeric and co-polymeric materials. Further, the embodiments described herein that refer to PEO or PEO/PEG are understood to encompass routine chemical modifications to the chemical structure of the PEO or PEO/PEG, where such routine chemical modifications do not substantially alter the structure, conductivity, and/or utility of the PEO or PEO/PEG.

PEO and PEG can be represented as structure (a):

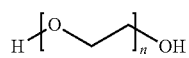

where n indicates the number of repeat units in the polymer chain and is greater than 1. PEO and PEG can be referred to as an "ethylene oxide" polymer. And the variations of PEO and PEG can be represented as structure (b):

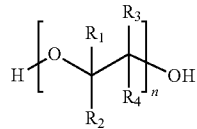

where $R_1$, $R_2$, $R_3$, and $R_4$ represent examples of the site of substitution that may be considered within the scope of the embodiments disclosed herein. Routine substitutions of groups include, but are not limited to, hydride groups, hydroxy groups, alkyl groups, alkenyl groups, alkynyl groups, aryl groups, iminyl groups, alkoxy groups, alkenoxy groups, alkynoxy groups, and aryloxy groups, each of which can contain further substitutions. Thus, "ethylene" oxide polymers embrace PEO, PEO/PEG, and the various modifications contemplated herein.

Certain embodiments of the invention employ polyvinylene diflouride (PVdF) as the polymer, which has significantly better voltage stability than the commonly used polyethylene-oxide-based solid-state electrolytes.

PVdF is a commodity polymer available in a variety of molecular weights, including molecular weights of 10,000, 000 g/mol (or 10,000 kDa). PVdF has been used as a binder in conventional electrodes. The use of PVdF as a binder in conventional electrodes is technically distinct from the use described herein, and such use in electrodes is not predictive of the results achieved by certain of the embodiments disclosed herein.

PVdF can be processed into multiple structures, whether intended for a solid-state electrolyte or not. While PVdF is discussed herein as a possible polymeric material for use in the solid-state electrolyte, it is understood that other polymers with equivalent chemical, electrochemical, mechanical, and/or thermal properties can be used in place of or in addition to PVdF. Further, copolymers that include PVdF or PVdF-like polymers in at least one segment of the copolymer can be suitable for certain embodiments described herein. Thus, the embodiments described herein that refer to PVdF are understood to encompass other such polymeric and co-polymeric materials. Further, the embodiments described herein that refer to PVdF are understood to encompass routine chemical modifications to the chemical structure of the PVdF, where such routine chemical modifications do not substantially alter the structure, conductivity, and/or utility of the PVdF.

PVdF can be represented as structure (c):

where n indicates the number of repeat units in the polymer chain and is greater than 1. And the variations of PVdF can be represented as structure (d):

where $R_1$ and $R_2$ represent examples of the site of substitution that may be considered within the scope of the embodiments disclosed herein. Routine substitutions of groups include, but are not limited to, hydride groups, hydroxy groups, alkyl groups, alkenyl groups, alkynyl groups, aryl groups, iminyl groups, alkoxy groups, alkenoxy groups, alkynoxy groups, and aryloxy groups, each of which can contain further substitutions.

Embodiments of the present invention include an inorganic ion-conducting material included with the polymer component in the solid-state electrolyte formulation. A preferred example of an inorganic ion-conducting material is $Li_{1.3}Ti_{1.7}Al_{0.3}(PO_4)_3$ ("LTAP"). Generally speaking, inorganic phosphates including one or more transition metals and one or more alkali metals are a preferred class of ion-conducting inorganic material. Inorganic phosphates provide a good blend of conductivity, stability, processability and ease of synthesis. However, the inorganic ion-conducting materials could also be other types of inorganic solid state electrolytes, such as $Li_{6.5}La_3Zr_{1.5}Ta_{0.5}O_{12}$ ("LLZTO"), $Li_{10}SnP_2S_{12}$ ("LSPS"), $P_2S_5$—$Li_2S$ glass, $Li_{1+x+y}Al_xTi_{2-x}Si_yP_{3-y}O_{12}$, or $Li_2PO_2N$ ("LiPON").

The lithium salts used to create the improved solid-state electrolytes disclosed herein include, but are not limited to, lithium bis(trifluoromethanesulfonyl)imide ($CF_3SO_2NLiSO_2CF_3$) (also referred to herein as "LiTFSI"), lithium tetrafluoroborate ($LiBF_4$), lithium hexafluoroarsenate ($LiAsF_6$), lithium bis(oxalato)borate ($LiB(C_2O_4)_2$) (also referred to herein as "LiBOB"), lithium chlorate ($LiClO_4$), lithium hexafluorophosphate ($LiPF_6$), Lithium bis(fluorosulfonyl)imide (LiFSI), and lithium triflate ($LiCF_3SO_3$). Preferably, lithium bis(trifluoromethanesulfonyl)imide is used in the solid-state electrolyte formulations.

One potential drawback for inorganic materials in a composite with polymer materials is that impedance can occur at the interfaces between the two types of materials. The materials can experience poor surface contact at their interfaces, which results in poor ionic conduction across these interfaces. The poor contact is typically the result of the mismatch in mechanical properties of each material, and can be exacerbated by chemical or electrochemical incompatibility between the two materials.

In order for the lithium conduction path to occur primarily in the inorganic phase, several conditions should be met. First, the interfacial impedance between the polymer and the inorganic particle should be low enough such that the energy required for lithium ions to cross the interface is less than the energy required to move through the polymer. Second, the polymer matrix should substantially wet and adhere to the inorganic during repeated cycling. If the organic materials are in particle form, particle-to-particle lithium-ion transport is difficult over large gaps in an unsintered material. In the embodiments disclosed herein, there may not be a sintering step. Thus, the inorganic materials should be well dispersed throughout the polymer to help minimize particle-to-particle distances.

According to certain embodiments disclosed herein, the potential for interfacial impedance in the composites can be mitigated through the use of chemical linking agents or chemical coupling agents. The coupling agents can aid in the dispersing, wetting, adhesion, and/or covalent bonding between the polymer and the inorganic material. The identity of the coupling agent can vary with the chemical nature of the polymer and the inorganic material. Typically, the coupling agent will have a first chemical group that is chemically compatible with the polymer and a second chemical group that is chemically compatible with the inorganic material. A spacing group can also be present in the coupling agent to space apart the first and second chemical groups to allow them to interact with their respective target materials unhindered. The spacing group can include carbonate-type structures similar to the liquid electrolytes known to be compatible with the electrolyte salts and other materials in use in conventional lithium ion batteries. Further, the coupling agents can facilitate agglomeration of inorganic particles to prevent the polymer from penetrating between the adhered particles and creating undesirably large conduction gaps.

The coupling agents can be considered to be molecular tethers that bond the inorganic material to the polymer. The bonding may be covalent, ionic, or other bonding. Coupling agents can ensure improved adhesion by chemically bonding the polymer to the inorganic particles. As described above, the coupling agents can consist of molecules with reactive groups on both ends, which are used to covalently link the two different materials. The coupling agents can provide a way to enhance the conductivity at the interface between the polymer and inorganic material.

Figure 2:
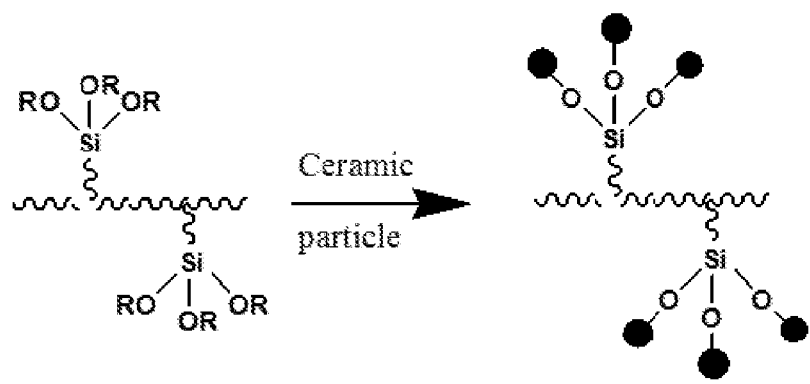
FIG. 2 illustrates a schematic for a synthetic route for forming a solid-state electrolyte according to certain embodiments of the invention.
Figure 3:
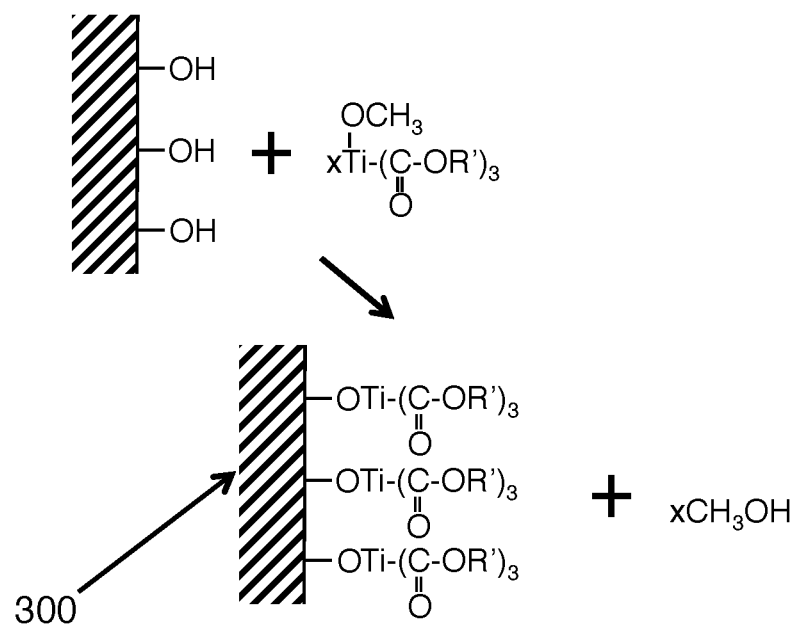
FIG. 3 illustrates a schematic for another synthetic route for forming a solid-state electrolyte according to certain embodiments of the invention.

Examples of coupling agents according to certain embodiments of the invention are shown in FIGS. 2 and 3. FIG. 2 illustrates the reaction of a silicon containing coupling agent with a ceramic particle, in which the $—Si(OR)_3$ groups react with functionalities on the ceramic surface to create silicon oxygen linkages to the particles. More generally, the coupling agent can have a structure such as $R—(CH_2)_n—Si—X_3$, where n is 1 or more and X is a hydrolysable group such as an alkoxy, acyloxy, amine, or halogen designed to react with the inorganic phase. In general, trifunctional agents are most preferred due to greater stability on surfaces. The bridging group $(CH_2)_n$ can vary in length and facilitates the interaction of the R group with the polymer.

In such embodiments, R includes, but is not limited to, hydride groups, hydroxy groups, alkyl groups, alkenyl groups, alkynyl groups, aryl groups, iminyl groups, alkoxy groups, alkenoxy groups, alkynoxy groups, and aryloxy groups, each of which can contain further substitutions. The R groups is chosen to have a moiety capable of reacting with the polymer. In some preferred embodiments, R includes a carbonate.

Organometallic species such as silanes, titanates, zirconates, and aluminates can be used as coupling agents. FIG. 3 illustrates the use of a titanate coupling agent with an ester structure at the interface. That is, the exposed hydroxyls on the inorganic particle are reacted with the Ti—OR group to form titanium oxygen linkages to the surface. One preferred coupling agent is 3-(trimethoxysilyl)propyl methacrylate.

Covalently bonded linkages could include silicon oxygen linkages, titanium oxygen linkages, etc. from reaction of M-O—R groups (where M is a metal, O is oxygen, and R is an organic functional groups such as the R groups identified above) to form metal oxygen bonds to elements on the particle surface. Other linkages could include hydrogen bonds, ionic bonds, dipole-dipole interactions, surfactant type-interactions, or solubility (e.g., a polymer linkage from the particle surface dissolved within the polymer matrix).

According to certain embodiments disclosed herein, the potential for interfacial impedance in the composites can be mitigated through the use of additives such as salts. As with the coupling agents, the identity of the salt can depend on the identity of the polymer and inorganic material, with salts chosen to be chemically compatible with each material. The salts can aid in the dispersing, wetting, adhesion, and/or covalent bonding between the polymer and the inorganic material.

Surface treatment of the inorganic phase may be required prior to the use of coupling agents. Suitable surface treatments include ionizing treatments, chemical etching, plasma treatments, and other forms of surface modification.

According to certain embodiments of the invention, the components of the electrolyte formulations can be combined in various weight percent ratios, where the weight percent refers to the percent of a component as compared to the total weight of the formulation. For example, the polymer can be present in the electrolyte formulation at a weight percent of from about 2% to about 15%, the inorganic ion conductor can be present in the electrolyte formulation at a weight percent of from about 40% to about 95%, the lithium salt can be present in the electrolyte formulation at a weight percent of from about 5% to about 35%, the coupling agent can be present in the electrolyte formulation at a weight percent of from about 0% to about 10%, and the other additives can be present in the electrolyte formulation at a weight percent of from about 0% to about 20%.

The polymer can be present in the electrolyte formulation at a weight percent of about 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %. The inorganic ion conductor can be present in the electrolyte formulation at a weight percent of about 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, or 95 wt %. The lithium salt can be present in the electrolyte formulation at a weight percent of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, or 35 wt %. The coupling agent can be present in the electrolyte formulation at a weight percent of about 0 wt %, 1 wt %, 2 wt %, 3 wt %, 4 wt %, 5 wt %, 6 wt %, 7 wt %, 8 wt %, 9 wt %, or 10 wt %. The other additives can be present in the electrolyte formulation at a weight percent of about 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

The solid-state batteries formed using the solid electrolyte formulations disclosed herein can be used with electrode configurations and materials known for use in solid-state batteries. The active material for use in the cathode can be any active material or materials useful in a lithium ion battery cathode, including the active materials in lithium metal oxides or layered oxides (e.g., $Li(NiMnCo)O_2$), lithium-rich layered oxide compounds, lithium metal oxide spinel materials (e.g., $LiMn_2O_4$, $LiNi_{0.5}Mn_{1.5}O_4$), olivines (e.g., $LiFePO_4$, etc.). Preferred cathode active materials include lithium cobalt oxide (e.g., $LiCoO_2$) and lithium layered oxides (e.g., $Li(Mn,Ni,Co)O_2$. Active materials can also include compounds such as silver vanadium oxide (SVO), metal fluorides (e.g., $CuF_2$, $FeF_3$), and carbon fluoride ($CF_x$). The finished cathode can include a binder material, such as poly(tetrafluoroethylene) (PTFE) or poly(vinylidene fluoride) (PVdF). More generally, the active materials for cathodes can include phosphates, fluorophosphates, fluorosulfates, silicates, spinels, and composite layered oxides. The materials for use in the anode can be any material or materials useful in a lithium ion battery anode, including lithium-based, silicon-based, titanium based oxides and carbon-based anodes.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Preparation of Solid-State Electrolyte Films.

Electrolytes were fabricated using a multi-step process. A lithium salt, such as LiTFSI, and a polymer, such as PVdF, were dissolved in a liquid solvent, such as n-methyl-2-pyrrolidone (NMP). The resulting solution was combined with an inorganic material, such as LTAP, and mixed for a period of at least six hours, but typically overnight. The resulting slurry was cast on a sheet of Teflon using a doctor blade to produce a film that was from about 61 to about 84 weight percent LTAP, 9 weight percent PVdF, and from about 7 to about 30 weight percent LiTFSI. The resulting film was dried at 150 degrees Celsius for several hours until ready for processing. The solid-state electrolyte film was cut to desired geometries and pressed at 3 ton/cm$^2$ prior to cell build. The typical solid-state electrolyte film thickness was between about 15 and 20 microns.

Cell Assembly.

Test cells were formed in a high-purity argon-filled glove box (M-Braun, $O_2$ and humidity content <0.1 ppm). The two electrodes were stainless steel. The electrolyte layers were placed between the stainless steel electrodes to assemble the cell stack. After assembly, the cell stack was annealed at from about 70 to about 110 degrees Celsius for about 2 hours with stack pressure maintained at a fixed amount. The cell was sealed and characterized.

Cell Characterization.

Electrochemical impedance spectroscopy (EIS) is used to determine the ionic conductivity of the solid-state electrolyte films. A film with known thickness and area is placed between two polished stainless steel (SS) disks, and an AC voltage (10 mV) is applied at varying frequencies. The resulting amplitude change and phase shift in the response is used to calculate ionic conductivity of the film. Herein, the cells were tested over a frequency range from 1 Hz to 1 MHz.

RESULTS

FIGS. 1A and 1B illustrate the results of electrochemical testing of solid electrolyte formulations according to certain embodiments of the invention. FIG. 1A illustrates a Nyquist plot, which shows the frequency response of the impedance of the cell and directly relates to the conductivity plot in FIG. 1B. FIG. 1B illustrates the conductivity of the test cells as a function of frequency. In each figure, the solid circles represent a solid-state electrolyte formed from PVdF and LiTFSI, and the solid triangles represent a solid-state electrolyte formed from PVdF, LiTFSI, and LTAP. Taken together, FIGS. 1A and 1B show that the solid-state electrolyte having a polymer/inorganic formulation (PVdF, LiTFSI, and LTAP) has improved conductivity as compared to the solid-state electrolyte having a polymer formulation (PVdF and LiTFSI).

The comparison between the polymer/inorganic formulation and the polymer formulation leads to the conclusion that lithium ion conduction is being driven through the inorganic component. That is, the polymer component is not a strong lithium ion conductor, while the inorganic component is a lithium ion conductor. Thus, the improvement in conductivity is likely due to the inorganic component, while the polymer component provides improved mechanical properties.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. A solid-state electrolyte comprising:
a lithium salt, particles of a lithium ion-conducting inorganic material, particles of a non ion-conducting polymer, and a coupling agent;
wherein the particles of the non ion-conducting polymer are dispersed throughout the particles of the lithium ion-conducting inorganic material, and the coupling agent bonds the ion-conducting inorganic material to the polymer, and
wherein the solid-state electrolyte is solvent free and unsintered.

2. The solid-state electrolyte of claim 1, wherein the coupling agent comprises a metal and an organic group.

3. The solid-state electrolyte of claim 1, wherein the coupling agent comprises silicon.

4. The solid-state electrolyte of claim 1, wherein the coupling agent comprises titanium.

5. The solid-state electrolyte of claim 1, wherein the coupling agent is trifunctional.

6. The solid-state electrolyte of claim 1, wherein the coupling agent comprises 3-(trimethoxy silyl)propyl methacrylate.

7. The solid-state electrolyte of claim 1, wherein the lithium salt is selected from the group consisting of lithium bis(trifluoromethanesulfonyl)imide, lithium tetrafluoroborate, lithium hexafluorophosphate, lithium hexafluoroarsenate, lithium bis(oxalato)borate, lithium chlorate, lithium bis(fluorosulfonyl)imide, and lithium triflate.

8. The solid-state electrolyte of claim 7, wherein the lithium salt comprises lithium bis(trifluoromethanesulfonyl)imide.

9. The solid-state electrolyte of claim 1, wherein the polymer comprises PVdF.

10. The solid-state electrolyte of claim 1, wherein the ion-conducting inorganic material is selected from the group consisting of $Li_{1.3}Ti_{1.7}Al_{0.3}(PO_4)_3$, $Li_{6.5}La_3Zr_{1.5}Ta_{0.5}O_{12}$, $Li_{10}SnP_2S_{12}$, $P_2S_5$—$Li_2S$ glass, $Li_{1+x+y}Al_xTi_{2-x}Si_yP_{3-y}O_{12}$, or $Li_2PO_2N$.

11. The solid-state electrolyte of claim 1, wherein the ion-conducting inorganic material comprises a phosphate group.

12. The solid-state electrolyte of claim 1, wherein the ion-conducting inorganic material comprises $Li_{1.3}Ti_{1.7}Al_{0.3}(PO_4)_3$.

13. The solid-state electrolyte of claim 1, wherein the polymer comprises PVdF, the lithium salt comprises lithium bis(trifluoromethanesulfonyl)imide, and the ion-conducting inorganic material comprises $Li_{1.3}Ti_{1.7}Al_{0.3}(PO_4)_3$.

14. A solid-state electrolyte comprising:
a lithium salt, particles of an ion-conducting inorganic material, a coupling agent, and particles of a non ion-conducting polymer, wherein the particles of the non ion-conducting polymer are dispersed throughout the particles of the lithium ion-conducting inorganic material, wherein the solid-state electrolyte is solvent free and unsintered;
wherein the ion-conducting inorganic material is selected from the group consisting of $Li_{6.5}La_3Zr_{1.5}Ta_{0.5}O_{12}$, $Li_{10}SnP_2S_{12}$, $P_2S_5$—$Li_2S$ glass, $Li_{1+x+y}Al_xTi_{2-x}Si_yP_{3-y}O_{12}$, or $Li_2PO_2N$, and wherein the coupling agent bonds the ion-conducting inorganic material to the polymer.

15. The solid-state electrolyte of claim 14, wherein the ion-conducting inorganic material comprises $Li_{6.5}La_3Zr_{1.5}Ta_{0.5}O_{12}$.

16. The solid-state electrolyte of claim 14, wherein the ion-conducting inorganic material comprises $Li_{10}SnP_2S_{12}$.

17. The solid-state electrolyte of claim 14, wherein the ion-conducting inorganic material comprises $P_2S_5$—$Li_2S$ glass.

18. The solid-state electrolyte of claim 14, wherein the ion-conducting inorganic material comprises $Li_{1+x+y}Al_xTi_{2-x}Si_yP_{3-y}O_{12}$.

19. The solid-state electrolyte of claim 14, wherein the ion-conducting inorganic material comprises $Li_2PO_2N$.

20. The solid-state electrolyte of claim 1, wherein the polymer has a concentration no less than 2 weight percent and no greater than 15 weight percent relative to a total weight of the solid-state electrolyte, and the inorganic ion-conducting material has a concentration no less than 40 weight percent and no greater than 95 weight percent relative to the total weight.

* * * * *